United States Patent
Loda et al.

(10) Patent No.: US 7,246,003 B2
(45) Date of Patent: Jul. 17, 2007

(54) DUAL-ARCHITECTURE MICROSERVER CARD

(75) Inventors: David C. Loda, Bolton, CT (US); Campbell Kennedy, Santa Monica, CA (US); Timothy A. Cormier, Manchester, CT (US); John F. Presper, Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/449,083

(22) Filed: Jun. 8, 2006

(65) Prior Publication Data

US 2006/0241845 A1 Oct. 26, 2006

Related U.S. Application Data

(62) Division of application No. 10/769,427, filed on Jan. 30, 2004, now Pat. No. 7,168,788.

(51) Int. Cl.
*G06F 19/00* (2006.01)
*G06F 17/00* (2006.01)

(52) U.S. Cl. ............................ 701/100; 701/2; 701/3; 701/33; 455/426.2

(58) Field of Classification Search ............... 701/100, 701/2, 133, 3; 455/426.2; 235/379, 380; 709/40 R
See application file for complete search history.

(56) References Cited

U.S. PATENT DOCUMENTS

2004/0177163 A1* 9/2004 Casey et al. ............... 709/249
2005/0022007 A1* 1/2005 Phillips et al. .............. 713/201

* cited by examiner

*Primary Examiner*—Tan Q. Nguyen
(74) *Attorney, Agent, or Firm*—Bachman & LaPointe, P.C.

(57) ABSTRACT

An integrated system for monitoring a deployed product on a movable platform, gathering data about the deployed product, and disseminating the data about the deployed product is disclosed. The system includes a server located on the movable platform capable of communication with the server from a remote location. The server communicates with a source of data about the deployed product. The system further includes a portal onto which data gathered by the server may be downloaded and with which one can upload information to the server. The system includes a dual architecture card which may be mounted in an electronic controller of the deployed product. The dual architecture card may include a closed architecture section executing proprietary software, and an open architecture receiving processed data from the closed architecture section through a secured connection. One or both of the closed architecture section and closed architecture section may include a microserver.

30 Claims, 3 Drawing Sheets

DUAL-ARCHITECTURE MICROSERVER CARD

CROSS-REFERENCE TO RELATED APPLICATION

This is a divisional application of Ser. No. 10/769,427, filed Jan. 30, 2004, now U.S. Pat. No. 7,167,788 and entitled DUAL-ARCHITECTURE MICROSERVER CARD, the disclosure of which is incorporated by reference herein as if set forth at length.

This application is related to U.S. patent application Ser. Nos. 10/769,427, filed on Jan. 30, 2004, and 10/155,593, filed on May 22, 2002, which both claim priority to U.S. provisional patent application Ser. No. 60/337,726, filed on Dec. 3, 2001, all of which are incorporated by reference herein.

FIELD OF THE DISCLOSURE

The present disclosure generally relates to integrated Internet systems and, more particularly, relates to the provision of an internet portal on board a deployed product.

BACKGROUND OF THE DISCLOSURE

There are three general types of maintenance for products. They are on-demand maintenance (usually when a product breaks), scheduled maintenance (based upon the best estimate of a manufacturer as to when something will wear out with normal usage), and condition based maintenance (maintenance that occurs when maximum usage is obtained from a part but just prior to part failure). On demand maintenance is self-explanatory. It is when a component fails and has to be repaired or replaced. This normally occurs as an end result of its operators not understanding its component life or the conditions of its use, and the highest costs, both physical and lost time, are associated with it. Unfortunately, it is also one of the most common types of maintenance. Scheduled maintenance is less costly but can be very wasteful. Depending upon the usage of a product, one may be replacing parts that still have a significantly useful life. This is also where corners tend to be cut by the customer when budgets become tight, and often leads back to the first type of maintenance described above. The third form of maintenance is condition-based maintenance and is the holy grail of maintenance in many industries. If a manufacturer or service organization can accurately ascertain the maximum life of a component based upon actual wear, tear, and usage, it could then allow for the optimized, just-in-time servicing and replacement of that component, thereby allowing for the user to gain maximum product life and to schedule the replacement at a non-critical time. As a result, a manufacturer utilizing condition based maintenance could better plan its spares production and save millions of dollars in unnecessary production, warehousing and inventory taxes.

There is however a catch to condition-based maintenance. A closed feedback loop system of information related to the use of each product must be provided. Without first-hand knowledge of how a product is being used after it is sold and deployed to the field, a manufacturer or service provider has no real way of knowing when components will wear out based on usage, and must therefore default back to using one or both of the first two types of maintenance described above. Operators are in the best position to gather this first hand knowledge, but most are too busy operating and making money with the product and have little time, money and/or inclination to attempt to capture this information to provide feedback to the manufacturer or service provider, even though it is in their own best interest to do so.

In an attempt to gather useful information from the field, a variety of methods have been used to try and solve the collection of product usage data. On the low end, customer surveys, feedback forms, and interaction with field support personnel have been the primary means of obtaining a rudimentary form of feedback. For complex and expensive products, such as aircraft engines, the most common form is that of paper-based operational logs. This is a highly manual and painful method of collecting operational information. Over the years, computer collection systems have tried to make this process easier, but they still require a great deal of manual intervention.

More recent advances have involved the incorporation of automated data recording devices onto products, such as engine data units (or EDUs), which are used on turbine engines, and which communicate with electronic engine control (EEC) systems and record operational data using a variety of sensors. However, it is still extremely difficult and costly to gather information from these data collection devices, as it must be done manually by mechanics in the field using specialized equipment or laptop computers temporarily cabled to the EDU or EEC, and with which they usually have little familiarity or interest. The only other option is to wait until the product is returned to a shop environment for a major overhaul and repair, at which point the data from a preventative maintenance perspective is moot, and useful only from a post analysis or fleet average perspective.

A number of industries normally attempt to gather product usage intelligence through manual inspections and, more recently, laptop computer downloads performed concurrently with scheduled or on-demand maintenance service calls. This is normally accomplished by one or two methods: sending a service person to the product, bringing the product to a service center, or both. Examples of the former include products with fixed installations, such as elevators, HVAC systems, nuclear power plants and large home appliances. Examples of the latter include automobiles, small home appliances, home electronics equipment, lawn-mowers, or anything small enough to be easily carried or shipped. Both methods are inefficient and result in significant down time.

With advances in low cost computing and the advent of wireless technologies and the Internet, companies are now looking at how they can collect product usage intelligence in an automated and remote fashion. Many of the systems which have evolved, such as VHF frequency, cell phone, or wireless land-based data download methods, tend to be very expensive as have attempts at using emerging technologies to accomplish essentially the same thing, i.e., using remote data file compression and download to a central location using a public or private network/Internet where the information can then be manually uncompressed and analyzed. As a result, the high cost associated with such methods restricts the application of wireless remote monitoring to high value products, such as jet aircraft and helicopters. Thus, there remains a need for a low cost, wireless system which accurately ascertains the condition of a deployed product based upon actual wear, tear, and usage and presents information about that condition to a user, a manufacturer, an operator, or any other interested party, that is deployable with the product and that provides greater flexibility and interaction than simple data downloading.

Moreover, in certain applications, such as aircraft engines, it may be desirable to wirelessly download engine data to a remote location, but not allow the remote location to gain access to all of the propriety algorithms, data, or software being utilized by the engine. Accordingly, a need exits for wireless system for communicating with a deployed product, wherein only certain information is accessible from the remote location.

SUMMARY OF THE DISCLOSURE

In accordance with one aspect of the disclosure, a system for communicating with the deployed product is disclosed, which comprises a deployed product, an electronic control box, a dual-architecture card, and a computing device. The electronic control box is operatively associated with the deployed product, while the dual-architecture card is mounted in the electronic control box. The dual-architecture card includes a closed architecture section and an open architecture section, with the open architecture section including a microserver generating a wireless system around the deployed product. The computing device is remote from the deployed product and is adapted to wirelessly communicate with the microserver.

In accordance with another aspect of the disclosure, a gas turbine engine is disclosed, which comprises a compressor section, a combustion section downstream of the compressor section, a turbine section downstream of the combustion section, a casing, an electronic control box, and a dual-architecture card mounted in the electronic control box. The casing surrounds the compressor section, combustion section, and turbine section while the electronic control box is mounted to the casing. The electronic control box controls and monitors operation of the engine. The dual-architecture card includes an open architecture section and a closed architecture section, with the open architecture section including a microserver.

In accordance with another aspect of the disclosure, a dual-architecture card for use in the deployed product is disclosed, which comprises a closed architecture section, an open architecture section, and a security connection between the closed architecture section and the open architecture section. The open architecture section includes a microserver generating a wireless system adapted to connect to the Internet. The security connection ensures proprietary software and data in the closed architecture section is not communicated to the open architecture section.

In accordance with a still further aspect of the disclosure, a method of communicating with a deployed product is disclosed, which comprises the steps of installing a dual-architecture card into an electronic control box of a deployed product, executing proprietary software on a closed architecture section of the dual-architecture card based on data received from the deployed product, transferring processed data from the closed architecture section to an open architecture section of the dual-architecture card, and wirelessly transmitting the processed data from the open architecture section to a remote computing device.

In accordance with a still further aspect of the disclosure, and electronic controller for an engine is disclosed which comprises a closed architecture section for controlling and monitoring the engine, an open architecture section including a microserver for generating a wireless system adapted to connect to the Internet, and a security connection between the closed architecture section and the open architecture section.

These and other aspects and features of the disclosure become more readily apparent upon reading the following detailed description when taken in conjunction with the accompanying drawings.

Figure 1:
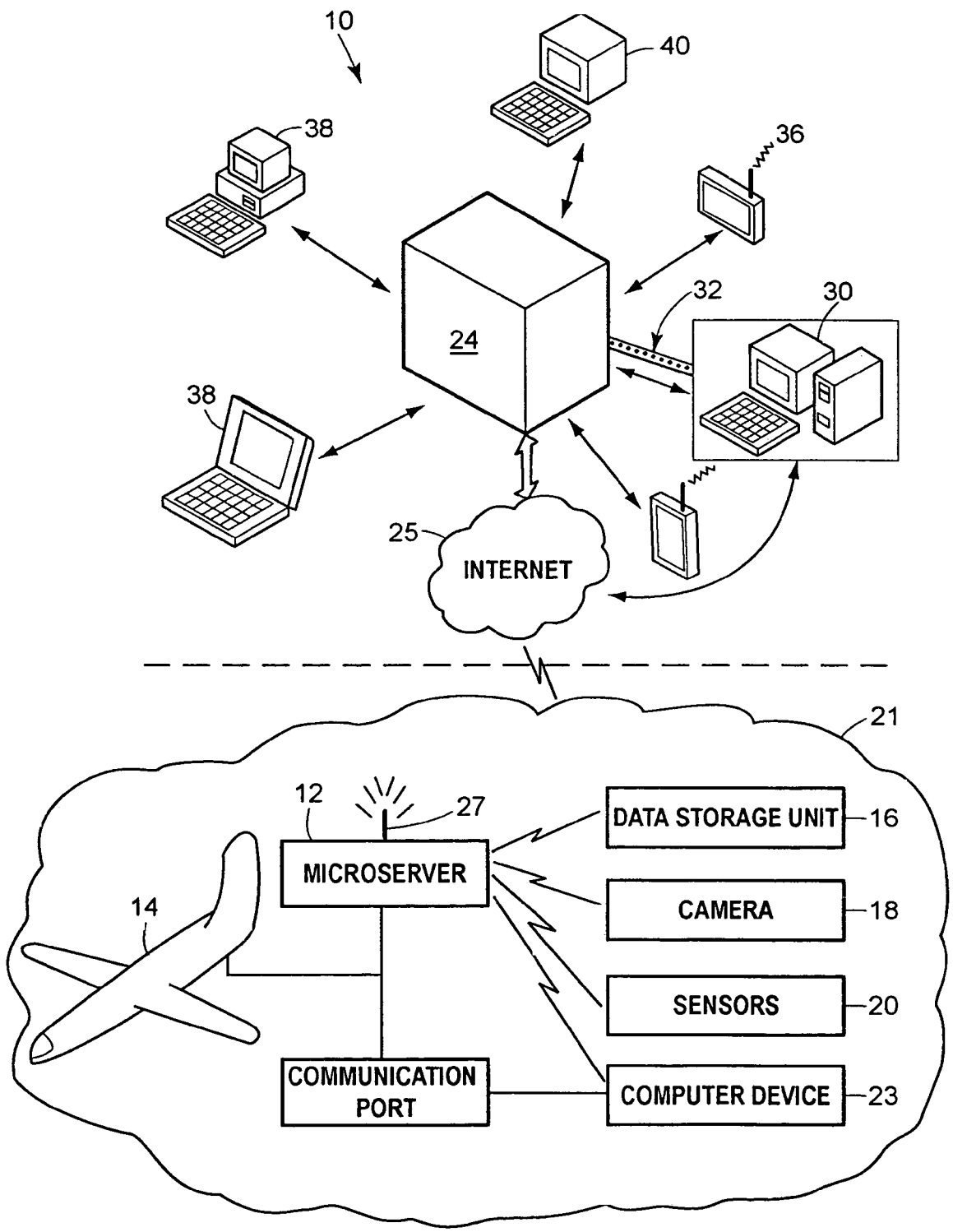
FIG. 1 is a schematic representation of an integrated system for monitoring, gathering data about, and disseminating data about a deployed product in accordance with one embodiment of the present disclosure.

While the following disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION OF THE DISCLOSURE

Referring now to FIG. 1, a system 10 is presented which is capable of monitoring a deployed product, gathering data about the deployed product, and disseminating the data to interested parties. It is also capable of monitoring and restricting access to its data, and can accept data for storage or integration within the product itself, such as firmware revision updates. As used herein, the term "deployed product" has broad applicability and refers to any product, component, or system on a variety of machines including, but not limited to a vehicle, a HVAC system, or an elevator/escalator system such as a propulsion system on a vehicle, a compartment of a vehicle, or a braking system for a vehicle, wherein the vehicle is any one of a number of movable devices including aircraft and elevator cars.

The system 10 includes a server 12 located on the deployed product or movable platform 14. The movable platform 14 may be a boat, an airplane, a spacecraft, an automobile, a truck, or any other entity that is movable with an airplane being depicted for ease of understanding. The server 12 may monitor the condition of and/or gather data about the deployed product in a number of ways. For example, the server 12 may be connected to or integrated with a vehicle data storage unit 16 which contains data about the deployed product. The server 12 may also be connected to a video camera 18, such as video web camera, to provide pictures, in real-time or on a delayed basis, of the deployed product. Still further, the server 12 may be connected to a number of sensors 20, such as a vibration sensor or a temperature sensor, which provide additional or environmental information about the condition of the deployed product.

The server 12 may be programmed in any suitable language known in the art to gather data about the deployed product and present the data to interested parties in a desired format. For example, the server 12 may be used to host a web page which provides information about one or more deployed products on the movable platform. The web page may have a menu which allows an interested party to gain access to gathered data about a particular deployed product. The data about the deployed product(s) may be organized on the server 12 and presented in any desirable format or manner. The server 12 may also be programmed to allow an interested party to carry out diagnostic operations on the deployed product(s) and/or to upgrade software associated with the deployed product(s). By providing the server 12 on the deployed product 14, a wireless system or intranet 21 is provided around the entire deployed product 14 enabling wireless communication to any electronic device thereon as will be described in further detail herein. The web page may have an IP address available for various Internet protocols including, but not limited to, HTTP, FTP, SMTP, UDP, ECHO, SSH, TELNET, NAMESERVER, BOOT PS, BOOT PC, TFTP, KERBEROS, POP3, NNTP, IMAP, SNMP, BGP, IMAP3, LDAP, and HTTPS.

While it is contemplated that the system 10 of the present disclosure would primarily be used to allow interested parties in remote locations to obtain information about a deployed product, there will be times when a mechanic or an engineer may want to interact with the server 12 while he or she is onboard the movable platform 14. To this end, the server 12 may be provided with a local USB or other communications port 22 for direct hook-up. A mechanic or engineer could then gain access to the server 12 by hooking up a promtop, laptop computer or another device 23 such as a video borescope or a bar code reader to the communications port 22. Other examples of communication ports through which access may be gained to server 12 include wireless peer-to-peer communication links. The mechanic or engineer could then conduct a desired diagnostic operation or even fix a problem with the deployed product. Similarly, any passenger on board the deployed product 14 could use his or her own computer device 23 to access the server 12 and thus the Internet 25, again as will be described in further detail herein.

The server 12 may comprise any suitable computer or processing unit known in the art. The server 12 may be a hand-held sized microserver using a Linux-based operating system or, as will be described in further detail herein, may be a card adapted to be installed in a larger computer device. Further, the server 12 may be provided with its own web address, a firewall, and security protocols known only to selected individuals, such as the manufacturer of the deployed product.

In accordance with the present disclosure, the server 12 is capable of being accessed by interested parties via a portal 24 and the Internet or world wide web 25. To this end, the server 12 may have a communications device, such as a modem built within it to allow communication between the server 12 and the portal 24. The communication device may allow for radio frequency communications such as cellular communication, satellite communication, and/or wireless communication between the server 12 and the portal 24. In addition, communications between the server 12 and the portal 24 may be achieved by optical means such as an infrared link.

The portal 24 is hosted by an external server which may be any suitable server known in the art. The server hosting the portal 24 also has appropriate communication means associated with it to allow it to gain access to and be accessed by the server 12.

Data gathered by and stored on the server 12 may be downloaded to the portal 24 as desired. For example, the server 12 may be programmed to periodically download data to the server hosting the portal 24 or to download data on specific events such as when an aircraft lands or when a truck or automobile reaches a particular destination. The server 12 may also download data to the portal 24 upon the activation of a switch by an operator onboard the moving platform. Alternatively, the portal server may upload data to the microserver, such as product firmware revisions or technical manuals for access by interested parties. The server may include an antenna 27 or the like to facilitate such wireless communication.

The portal 24 may be provided with a number of software tools called gadgets to automatically analyze, organize, and sort the data which has been received from the server 12. The data is preferably sorted so that different communities gain access to different portions of the data. For example, actual and potential customers of a vendor of a deployed product may form one community and have access to certain data, while support engineers and product designers may form a second community and have access to another form of the data. As can be seen from the foregoing discussion, the portal 24 offers great flexibility as to how and to whom the data is disseminated. Still further, the portal 24 provides virtual shared spaces which allow for the common space posting and access of information about a deployed product in a shared awareness between customers, support engineers, field operatives, and even product designers. The portal 24 may also be designed to provide chat rooms, bulletin boards, and on-line meeting capabilities where interested parties can communicate with each other.

One of the advantages to using the portal 24 is that its functionality can be carried out in a secure, user friendly, web-based environment. Members of a particular community can log in by presenting an identification and/or a password and gain access to current information about a deployed product. Another advantage to using the portal 24 is that it can be used to upload data, information, instructions, software, technical publications, diagnostic programs, etc. to the server 12. Thus, an engineer can perform diagnostic tests on a deployed product from a remote location using the Internet. Similarly, a service engineer working in the aircraft can gain access to a technical publication outlining how to repair a certain situation, for example, through the server 12. As the communication is two way, access, upload, download, and execution of all such information and data can be performed at the deployed product or remote locations.

Access to the portal 24 may be gained in a number of different ways by a variety of devices as described below. For example, an interested party can communicate with the portal 24 through his/her personal computer 38 and the web browser on the computer 38. The computer 38 may be a PC workstation at an office of a user or a laptop or PC at the home of a user. Even a computer 40 in an Internet café may be used to gain access to the portal 24. A wireless PC tablet 36 on the shop floor of a manufacturer of the deployed product may also be used to communicate with the portal 24. The portal 24 may also be in communication with the internal network 30 of the manufacturer of or a vendor of the deployed product. When the portal 24 is to be in communication with the network 30, a secure data pipe 32 may be used for crawlers for automated data exchange. If desired, the portal 24 may communicate with the internal network 30 via a wireless PDA.

The system 10 may also be configured to allow the internal network 30 to communicate directly with the server 12 via the Internet by dialing up the web address for the server 12. When in such a configuration, a firewall may be provided between the internal network 30 and the server 12.

As can be seen from the foregoing discussion, the system 10 of the present disclosure has broad applicability and can be used for a wide variety of purposes. For example, as previously mentioned, the system 10 can be used by an engineer working for a manufacturer of the deployed product to gain access to the server 12 and to then carry out a diagnostic operation or a fix on a particular deployed product. All of this can be carried out while the movable platform 14 is in motion and in a location remote from the engineer, thus avoiding having to return a deployed product to a manufacturer for diagnosis and repair.

The system 10 may also be used to check the status of a deployed product. For example, an operator of a fleet of airplanes having a network 30 may contact the server 12 on a particular airplane, either directly or through the portal 24, and learn the location of and the status of that airplane. Alternatively, a manufacturer of a jet engine may access the server 12 through its network, again either directly or through the portal 24, to ascertain the condition of a particular jet engine or a particular component on the jet engine to determine when that engine or component may require to servicing, and to collect data in determining product and fleet averages for improved product design and support. This can save the manufacturer unnecessary warranty, maintenance wear, and spare parts production costs.

One advantage to the system of the present disclosure is that it may be easily and cheaply installed into a vehicle. For example, the server 12 may be installed in the cabin of an aircraft, by using existing test ports already wired into the engine/airframe. Once installed, the server 12 generates a local wireless intranet in and around the deployed product capable of operating in conjunction with, or independent from, the Internet. The microserver 12 can act as a coordinating server in communication with other computing devices, servers, and systems onboard the deployed product.

Figure 2:
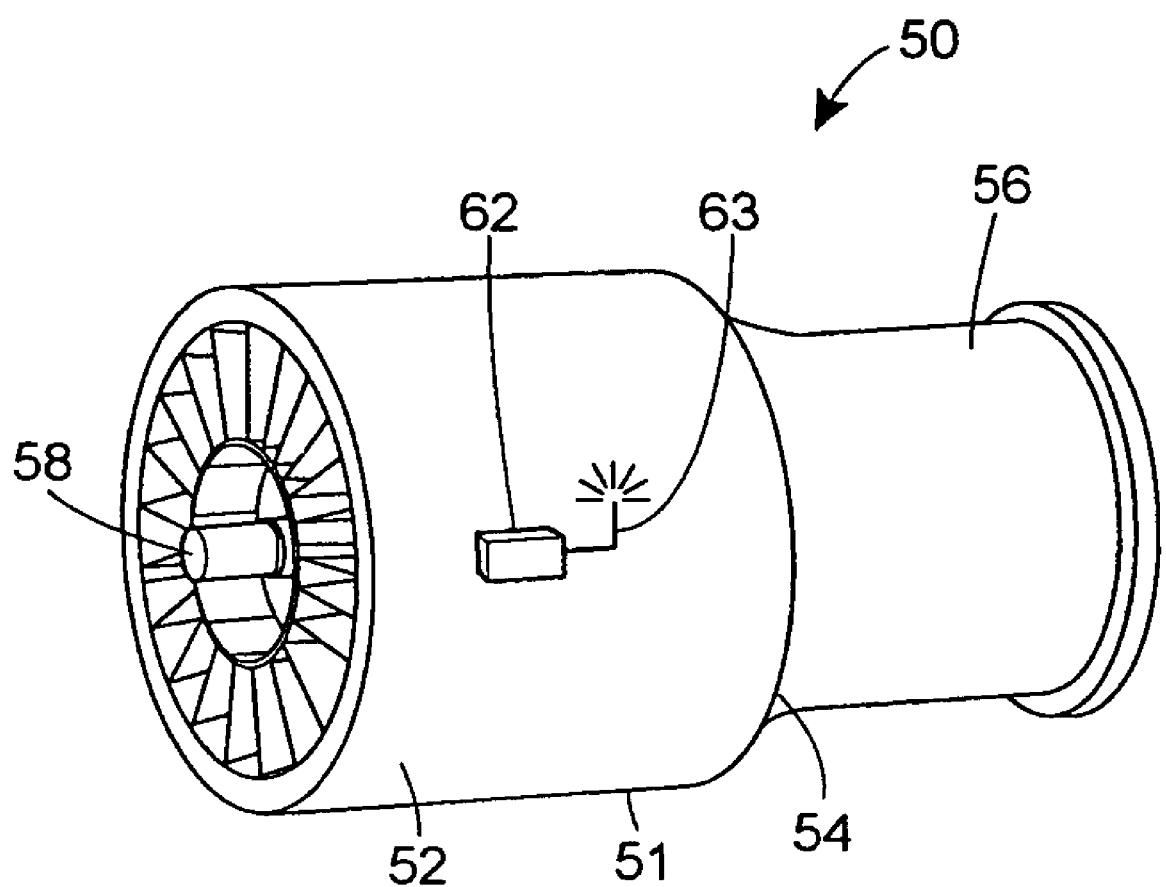
FIG. 2 is a perspective view of a gas turbine engine constructed in accordance with one embodiment of the present disclosure.
Figure 3:
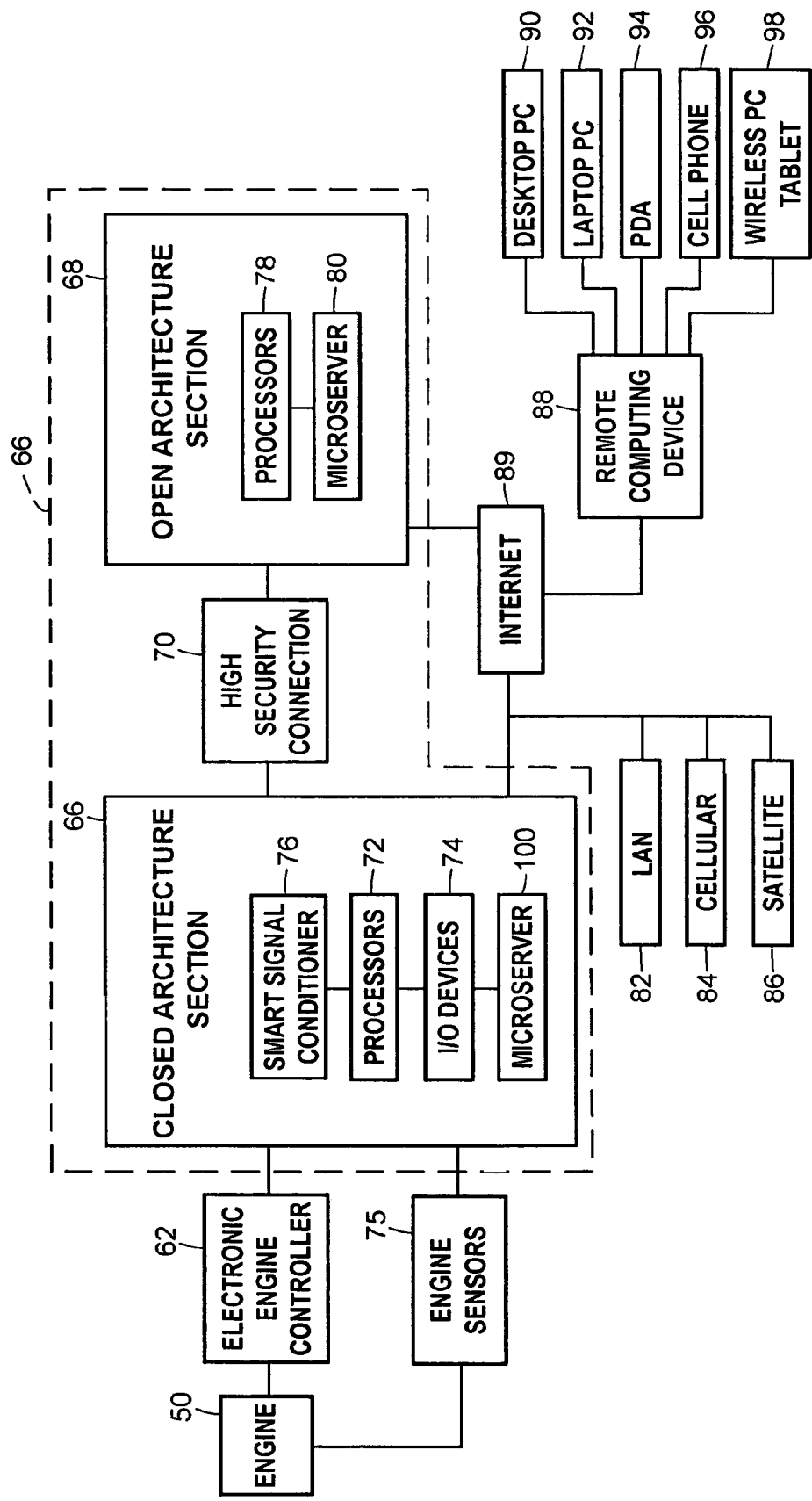
FIG. 3 is a block diagram illustrating one embodiment of a dual architecture card construction in accordance with the teachings of the disclosure.

As indicated above, at times it may be desirable to restrict access to data on the server. One example where this may be particular advantageous may be with respect to aircraft engines. As indicated in FIGS. 2 and 3, an engine 50 of an aircraft is depicted, such as a gas turbine engine used for propulsion. In such an engine, a fan case 51 surrounds compressor section 52, a combustion section 54, and a turbine section 56. The compressor section 52 ingests ambient air, compresses that air and directs the compressed air to the combustion section 54 where it is combined with fuel and ignited. The resulting combustion gases, which are very hot and rapidly expanding, are directed to the turbine section 56 where they impart force to rotatable blades. The blades rotate and cause a shaft assembly 58 extending through the engine to rotate as well. Since blades of the compressor section 52 are mounted to the same shaft assembly 58, the compressor section 52 rotates as well, thereby drawing in more ambient air and perpetuating the engine cycle.

Operation of the engine 50 is controlled and monitored by an electronic controller or control box 62, known by different acronyms within the industry such as, for example, a FADEC (Full Authority Digital Engine Control) or an EEC (Electronic Engine Control). Such a controller 62 receives data from the engine by way of hard-wired inputs, wireless inputs, RF ID tags and the like, calculates correctional signals to optimize operation, and transmits control signals back to the engine. The means for controlling the engine may employ any known technology, but generally performs as an electronic fuel control or injector taking power and throttle commands/signals from the cockpit and adjusting engine control to provide the desired power. The EEC or other electronic control may include a plurality of cards or boards, including a motherboard, slidably mounted in a rack of the EEC. The cards/boards receive inputs from the cockpit and various engine sensors, and outputs signals to various valves and controls of the engine to effectuate its operation. The controller 62 may include an antenna 63 to facilitate wireless communication.

As the software or algorithms used by the engine 50 in doing this may be propriety, or it may otherwise be desirable to keep such information from outside observers, it is necessary to ensure such software is executed in a safe or closed capacity. In prior art engines wherein wireless capability is not provided, this is relatively easy to accomplish in that to gain access to the software, a user had to be hardwired to the controller 62. However, as the present disclosure provides a microserver on the engine 50 and thus enables wireless communication with remote computing devices, a system is provided to more internally protect the proprietary software.

Referring now to FIG. 3, the dual-architecture card 64 of the present disclosure is depicted as the mechanism by which such protection is accomplished. As shown therein, the dual-architecture card 64, which may be mounted directly within the EEC 62 along with other electronic cards, includes a closed architecture section 66 and an open architecture section 68 connected by a high security connection 70. Engine control algorithms are processed by the closed architecture section 66 for operation of the engine 50, and only data processed or "cleaned" by the closed architecture section 66 is then communicated to the open architecture section 68 for access by interested parties.

To accomplish such functions, the closed architecture section 66 may include one or more processors 72 and one or more input/output devices 74. The closed architecture section 66 may include a smart signal conditioner 76 having various microprocessors such as predictive maintenance chips or modules, diagnostic modules, compressor stall analysis modules, etc. which run proprietary, embedded engine-specific algorithms that process engine data received from engine sensors 75. The chips and modules are hard-coded into the smart signal conditioner 76 so as to render their algorithms inaccessible to the other operators, such as original equipment manufacturers (OEMs), with data access. The closed architecture section 66 can then feed calculated data and signals back into engine controller 62 and other aircraft systems such as hydraulics, landing gear, flaps, and mission profile, for real-time mission adaptive processing and performance optimization.

While it may be desirable to prevent proprietary algorithms and data from being accessed, certain data which has been processed so as to prevent the algorithms from being reversed engineered or the like, may be advantageously accessed by outside, remote users. Accordingly, the open architecture section 68 may include one or more processors 78 and a microserver 80. As with the microserver 12, referenced above, the microserver 80 generates a wireless system or intranet about the aircraft or engine 50 enabling communication with the Internet as by a local area network (LAN) 82, cellular network 84, or satellite 86. The microserver, for example, may host a webpage enabling remote computing devices 88 to log into the webpage by way of the Internet 89 and receive the processed data.

Any number of remote computing devices may be employed such as, but not limited to, desktop computers 90, laptop computers 92, personal digital assistants 94, cellular phones 96, and wireless PC tablets 98. In doing so, a user in a location remote from the airborne aircraft, such as in an office, home, or maintenance facility, can gain access to certain engine data while maintaining the proprietary nature of certain engine algorithms. The engine 50 is able to do so due to the dual architecture card 64 and its smart signal conditioner 76 and high security connector 70 between the open architecture section 68 and closed architecture section 66.

In another embodiment, the closed architecture section 66 includes its own microserver 100. The microserver 100 may host is own webpage, and by way of a secure internet connection, enable owners of the engine to gain access to the raw engine data, or modify the proprietary algorithm. Such a system may enable software upgrades from remote locations while still preventing unwanted access.

From the foregoing, one of ordinary skill in the art will recognize the teachings of the disclosure can enable remove access to certain real-time data of a deployed product while still protecting certain other data or software of the deployed product from being remotely accessed. While the system has been described with reference to aircraft engines, it is to be understood that it could be used on any other form of deployed product as defined hereinabove.

What is claimed is:

1. A system for communicating with a deployed product, comprising:
    an electronic controller operatively associated with the deployed product;
    a dual-architecture card mounted in the electronic controller, the dual-architecture card including a closed architecture section and an open architecture section, the open architecture section including a microserver, the microserver generating a wireless system around the deployed product; and
    a computing device remote from the deployed product, the computing device adapted to wirelessly communicate with the microserver.

2. The system of claim 1, wherein the microserver hosts a web page and the computing device accesses the web page through the Internet, the web page having an IP address available for a plurality of Internet protocols.

3. The system of claim 2, wherein the microserver and computing device communicate wirelessly by way of a local area network.

4. The system of claim 2, wherein the microserver and computing device communicate wirelessly by way of a cellular network.

5. The system of claim 2, wherein the microserver and computing device communicate wirelessly by way of satellite.

6. The system of claim 1, wherein the deployed product is an aircraft engine.

7. The system of claim 1, wherein the deployed product is an aircraft.

8. The system of claim 1, wherein the closed architecture section includes a smart signal conditioner.

9. The system of claim 1, wherein the closed architecture section includes a microserver.

10. The system of claim 1, wherein the closed architecture section includes a security connection between the closed architecture section and the open architecture section.

11. The system of claim 1, wherein the computing device is selected from the group of computing devices consisting of desktop computers, laptop computers, personal digital assistants, cellular telephones, and wireless PC tablets.

12. The system of claim 1, wherein the closed side executes proprietary, protected software.

13. The system of claim 1, wherein the open side executes unprotected software.

14. The system of claim 1, wherein the dual-architecture card performs as a client to the Internet.

15. The system of claim 1, wherein the dual-architecture card performs as a server to the computing device remote from the deployed product.

16. The system of claim 1, wherein the dual-architecture card generates a local wireless intranet in and around the deployed product capable to operating in conjunction with the Internet the local wireless intranet also being capable of operating independently of the Internet.

17. The system of claim 1, wherein the dual-architecture card acts as a coordinating server in communication with other computing devices, servers, and systems onboard the deployed product.

18. The system of claim 1, wherein the dual-architecture card hosts software tools for data analysis.

19. The system of claim 18, wherein the software tools for data analysis are accessible from the computing device remote from the deployed product.

20. The system of claim 1, wherein the dual-architecture card hosts technical publications about the deployed product.

21. The system of claim 20, wherein the technical publications are accessible from the computing device remote from the deployed product.

22. A method of communicating with a deployed product, comprising:
    installing a dual-architecture card into an electronic controller of a deployed product, the dual-architecture card including a closed architecture section and an open architecture section;
    executing proprietary software on the closed architecture section based on data received from the deployed product;
    transferred processed data from the closed architecture section to the open architecture section for access from the Internet or local computing devices; and
    wirelessly transmitting the processed data from the open architecture section to a remote computing device.

23. The method of claim 22, further including the step of providing a microserver on the open architecture section.

24. The method of claim 23, further including the step of hosting a web page on the microserver, the web page having an IP address available for a plurality of Internet protocols.

25. The method of claim 24, wherein the web page is accessible through the Internet and a local area network.

26. The method of claim 24, wherein the web page is accessible through the Internet and a cellular network.

27. The method of claim 24, wherein the web page is accessible through the Internet and a satellite.

28. The method of claim 22, wherein the transferring step is performed through a security connection ensuring the proprietary software is not accessible by the open architecture section and the Internet.

29. The method of claim 22, wherein the deployed product is an aircraft engine.

30. The method of claim 22, wherein the remote computing device is selected from the group of remote computing devices including desktop computers, personal digital assistants, wireless PC tablets, cellular phones and laptop computers.

* * * * *